US009276776B2

(12) United States Patent
Nagarahalli

(10) Patent No.: US 9,276,776 B2
(45) Date of Patent: Mar. 1, 2016

(54) METHODS AND APPARATUS FOR BANDWIDTH MANAGEMENT WITHIN A MEDIA OVER INTERNET PROTOCOL NETWORK BASED ON A SESSION DESCRIPTION

(75) Inventor: Honnappa Nagarahalli, Germantown, MD (US)

(73) Assignee: GENBAND US LLC, Plano, TX (US)

( * ) Notice: Subject to any disclaimer, the term of this patent is extended or adjusted under 35 U.S.C. 154(b) by 1661 days.

(21) Appl. No.: 11/864,069

(22) Filed: Sep. 28, 2007

(65) Prior Publication Data

US 2009/0086717 A1    Apr. 2, 2009

(51) Int. Cl.
*H04L 12/66*    (2006.01)
*H04L 29/06*    (2006.01)

(52) U.S. Cl.
CPC ............ *H04L 12/66* (2013.01); *H04L 65/1003* (2013.01); *H04L 69/24* (2013.01)

(58) Field of Classification Search
CPC ....................................................... H04L 12/66
USPC ......................................................... 370/352
See application file for complete search history.

(56) References Cited

U.S. PATENT DOCUMENTS

| 6,600,737 | B1 | 7/2003 | Lai et al. |
| 6,904,017 | B1 | 6/2005 | Meempat et al. |
| 6,944,678 | B2 | 9/2005 | Lu et al. |
| 7,116,767 | B2 | 10/2006 | Yang et al. |
| 7,151,781 | B2 | 12/2006 | MeLampy et al. |
| 7,796,603 | B1* | 9/2010 | Bertone et al. ............ 370/395.2 |
| 2004/0125802 | A1 | 7/2004 | Lillie et al. |
| 2005/0111462 | A1* | 5/2005 | Walton et al. ............. 370/395.4 |
| 2006/0174021 | A1* | 8/2006 | Osborne et al. .............. 709/230 |
| 2006/0251093 | A1* | 11/2006 | Curcio et al. ................ 370/412 |
| 2006/0285493 | A1* | 12/2006 | Manuja et al. ............... 370/235 |
| 2007/0036151 | A1 | 2/2007 | Baeder |
| 2007/0076603 | A1 | 4/2007 | MeLampy et al. |
| 2008/0101412 | A1* | 5/2008 | Schwagmann et al. ....... 370/474 |

FOREIGN PATENT DOCUMENTS

EP    0 969 687 A1    1/2000
EP    1 248 431 A1    10/2002

(Continued)

OTHER PUBLICATIONS

Schulzrinne and Casner, RTP Profile for Audio and Video Conferences with Minimal Control, Jul. 2003, Networking Working Group, RFC 3551.*

(Continued)

*Primary Examiner* — Parth Patel
(74) *Attorney, Agent, or Firm* — Jenkins, Wilson, Taylor & Hunt, P.A.

(57) ABSTRACT

In one embodiment, a method includes receiving a request to establish at least a portion of a media session between a session exchange device and a network entity based on at least a portion of a session description. The session exchange device and the network entity being associated with a media over internet protocol (MoIP) network. The method includes receiving an indicator at the session exchange device that the portion of the session description is not associated with a predefined data-transfer-rate value. A request for a user-defined data-transfer-rate value is sent in response to the indicator.

19 Claims, 4 Drawing Sheets

(56) References Cited

FOREIGN PATENT DOCUMENTS

| WO | WO 2004/030286 A1 | 4/2004 |
| WO | WO 2004/045230 A1 | 5/2004 |

OTHER PUBLICATIONS

Notifiication of Transmittal of the International Search Report and the Written Opinion of the International Searching Authority, or the Declaration for International Application No. PCT/US08/77986 (Dec. 8, 2008).

Yenra: VOIP: Session Border Controller [online], dated Oct. 18, 2004, [retrieved on Dec. 20, 2004]. Retrieved from the Internet: <URL yenra.com/session-border-controller/> (2 pages).

Acme Packet, Inc., "Session Admission Control: Interactive Communication SLAs over Skinny Pipes" (2002) (14 pages).

Schulzrinne et al., "RTP Payload for DTMF Digits, Telphony Tones and Telephony Signals," RFC 2833, pp. 1-29 (May 2000).

Extended European Search Report for European Application No. 08834486.6 (Sep. 3, 2013).

Sawada et al., "SIP (Session Initiation Protocol) Usage of Offer/Answer Model draft-ietf-sipping-sip-offeranswer-03.txt," pp. 1-24 (Aug. 28, 2007).

First Office Action for Chinese Patent Application No. 200880117852.1 (Mar. 7, 2012).

\* cited by examiner

METHODS AND APPARATUS FOR BANDWIDTH MANAGEMENT WITHIN A MEDIA OVER INTERNET PROTOCOL NETWORK BASED ON A SESSION DESCRIPTION

BACKGROUND

One or more embodiments of the invention relate generally to bandwidth management, including, for example, to methods and apparatus for media signal management within a media over internet protocol (MoIP) network based on a session description.

Voice telecommunications have historically been conducted via dedicated telephone networks using telephone switching offices and either wired or wireless connections for transmitting the voice signals between users' telephones. Such telecommunications, which can use the public switched telephone network (PSTN), can be referred to as circuit-committed communications. Because of the circuit-based nature of the PSTN, the bandwidth of a connection often depends on the capacity of the circuits that make up the connection.

MoIP, also referred to as session over internet protocol (SoIP), provides an alternative communication system that uses discrete internet protocol (IP) packets of digitized information to transmit media content such as voice content, video content and/or data, over the internet or within an intranet via wired and/or wireless connections. MoIP technology includes voice over internet protocol (VoIP) technology, which is used primarily to transmit voice signals over an IP network. Known MoIP communication system components do not provide bandwidth management of media signals. Thus, a need exists for methods and apparatus for media signal management within a MoIP network based on a session description.

SUMMARY OF THE INVENTION

In one embodiment, a method includes receiving a request to establish at least a portion of a media session between a session exchange device and a network entity based on at least a portion of a session description. The session exchange device and the network entity being associated with a media over internet protocol (MoIP) network. The method includes receiving an indicator at the session exchange device that the portion of the session description is not associated with a predefined data-transfer-rate value. A request for a user-defined data-transfer-rate value is sent in response to the indicator.

DETAILED DESCRIPTION

Figure 1:
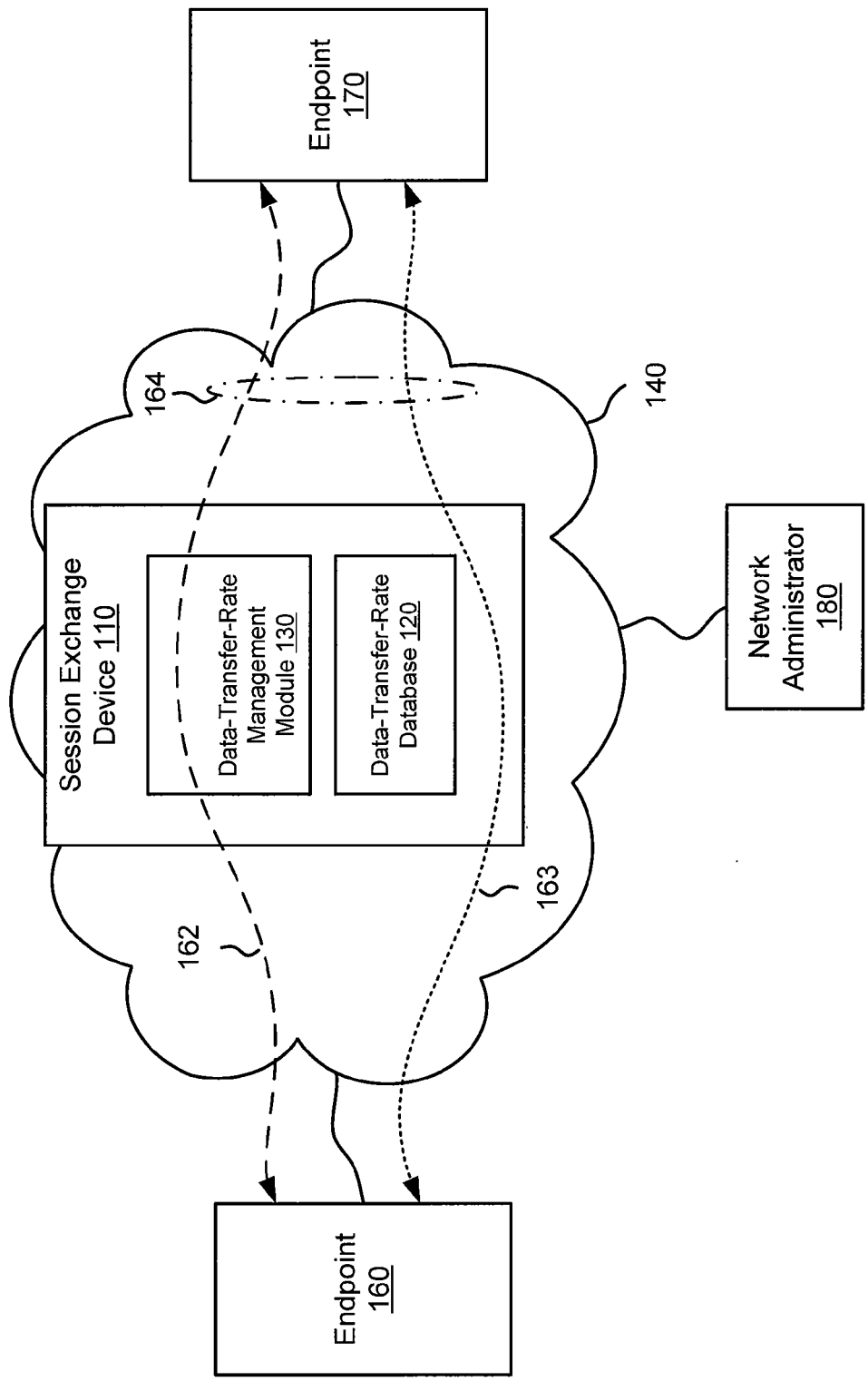
FIG. 1 is a schematic block diagram that illustrates a session exchange device configured to manage a data-transfer rate of a media signal transmitted via a network, according to an embodiment of the invention.

A session exchange device within a media over Internet Protocol (MoIP) network can be configured to manage a data-transfer rate of a media signal (e.g., an audio signal, a video signal, a stream of internet protocol (IP) packets) transmitted from the session exchange device and associated with a media session (e.g., layer-5 session used for media communications). A MoIP network can be, for example, a voice over internet protocol (VoIP) network and/or a session over internet protocol (SoIP) network. The media session can be established between the session exchange device and another network entity within the MoIP network based on a session description. The session description can be sent via a session control signal such as a session initiation protocol (SIP) signal or an H.323 signal.

The session description can include one or more session values that can be used to define portions of a media session before a media signal associated with the media session is transmitted. The session values can be used to convey media details (e.g., codec type, payload type), transport addresses, and/or other session-related metadata (e.g., date/timestamp values) to endpoints (e.g., session exchange devices) associated with the media session. The session description can be based on, for example, a standard protocol such as a session description protocol (SDP) and/or a proprietary protocol. If based on SDP, the session values can be included in, for example, a media description field of an SDP packet (e.g., included as an rtpmap attribute of a media description field).

A session exchange device can be configured as a session-aware device that can determine a data-transfer-rate value (e.g., maximum data-transfer-rate value) used for managing the data-transfer rate of a media signal associated with a media session. The data-transfer-rate value can be determined by the session exchange device based on at least a portion of session values from a session description. The portion can be a set of session values or a combination of session values. In some embodiments, the set of session values can correspond to a parameter values of a codec (e.g., a coder-decoder, a compressor-decompressor). In some embodiments, one or more data-transfer-rate values used to manage the data-transfer rate can be received from, for example, a database based on a set of session values from a session description.

If a set of session values from a session description is not associated with a predefined data-transfer-rate value, a default data-transfer-rate value can be used manage a media signal and/or a request for a data-transfer-rate value can be defined and sent to, for example, a user. When a data-transfer-rate value is received in response to the request, the data-transfer-rate value can be associated with the set of session values so that the data-transfer-rate value can be retrieved and used to manage a data-transfer rate of a media signal associated with a media session later established based on a similar or the same set of session values.

FIG. 1 is a schematic block diagram that illustrates a session exchange device 110 configured to manage a data-transfer rate of a media signal 162 transmitted via a network 140, according to an embodiment of the invention. The media signal 162 is associated with a media session 164 established between endpoint 160 and endpoint 170 based on at least a portion of a session description. The media session 164 is established based on one or more requests and/or responses 163 (e.g., SIP messages) associated with the session description before the media signal 162 is transmitted between endpoint 160 and endpoint 170. In some embodiments, endpoint 160 and/or endpoint 170 can be a source endpoint and/or a destination endpoint. In some embodiments, the session description can be defined in accordance with SDP.

The network 140 can be a wireless network and/or a wired network configured to transmit data and/or media content such as voice content and/or video content. For example, portions of the network 140 can be used for MoIP sessions such as VoIP sessions. In some embodiments, the session exchange device 110 can be, for example, a multi-protocol session exchange device configured to operate as a session border controller for the network 140.

The data-transfer rate of the media signal 162 between endpoint 160 and endpoint 170 is managed by a data-transfer-rate management module 130 of the session exchange device 110 based on a data-transfer-rate value received (e.g., retrieved) from a data-transfer-rate database 120. Specifically, the session exchange device 110 is configured to manage the data-transfer rate of the portion(s) (not shown) of the media signal 162 transmitted from the session exchange device 110 (e.g., egress portions). The data-transfer-rate value can be, for example, a maximum data-transfer rate (e.g., 10 megabits per second (mbs)) allowed for transmission of the media signal 162, or a minimum bandwidth allocation for the media signal 162. In some embodiments, the data-transfer-rate value can be referred to as a bandwidth value.

The data-transfer-rate management module 130 can be configured to manage the media signal 162 based on a data-transfer-rate value by modifying at least a portion of the media signal 162. For example, if the data-transfer rate of the media signal 162 exceeds a maximum data-transfer-rate value, the data-transfer-rate management module 130 can be configured to drop IP packets of the media signal 162 until the data-transfer rate of the media signal 162 is below the maximum data-transfer-rate value.

The data-transfer-rate value can be received before, after, or during establishment of the media session 164. For example, the data-transfer-rate management module 130 can send a request for a data-transfer-rate value to the data-transfer-rate database 120 any time before the media session 164 is established (e.g., before receiving a request to establish the media session 164, during establishment of the media session 164). If the data-transfer-rate value for this type of media session 164 exists in the data-transfer-rate database 120 (e.g., if the data-transfer-rate value is a predefined value and based on the specific session characteristics), it can be sent from the data-transfer-rate database 120 to the data-transfer-rate management module 130 in response to the request.

The data-transfer-rate management module 130, in some embodiments, can request that a data-transfer-rate value be sent from the data-transfer-rate database 120 after a media session 164 has been established (e.g., in response to an indicator that a media session has been established). In some embodiments, the data-transfer-rate management module 130 can request a data-transfer-rate value after a media session 164 has been established, but before one or more portions of the media signal 162 has been transmitted from the session exchange device 110.

Figure 2:
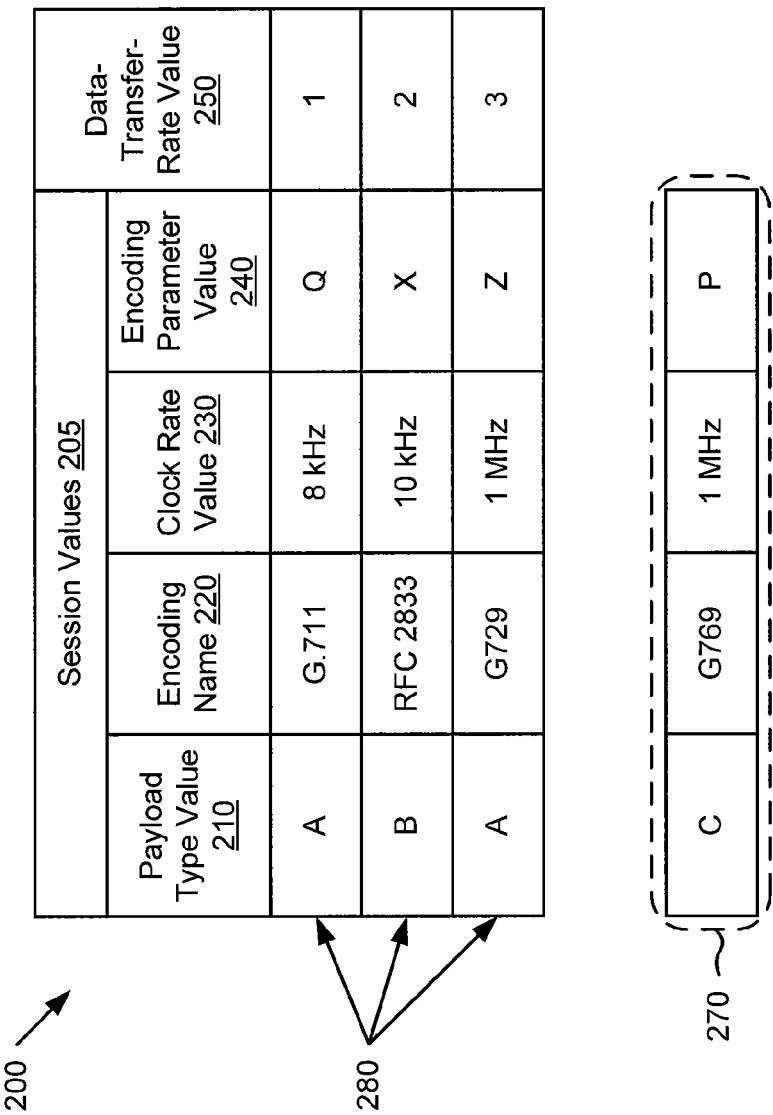
FIG. 2 illustrates a table that can be used to determine a data-transfer-rate value based on one or more session values, according to an embodiment of the invention.

The data-transfer-rate value used to manage the data-transfer rate of the media signal 162 can be obtained or selected from the data-transfer-rate database 120 based on one or more session values from the session description (e.g., a combination of session values). FIG. 2 illustrates a table 200 that can be used to determine a data-transfer-rate value 250 based on one or more session values 205, according to an embodiment of the invention. The session values 205 shown in this table 200 are based on SDP, but can be based on other protocols in other embodiments.

As shown in FIG. 2, a data-transfer-rate value 250 is associated with a single row of session values 205. Each row of session values 205 or portion of a row of session values 205 can be referred to as a set of session values 280. For example, a data-transfer-rate value of 2 (column 250) is associated with a payload type value of B (column 210), an encoding name of RFC 2833 (column 220), a clock rate value of 10 kilohertz (kHz) (column 230), and an encoding parameter value of X (column 240). When this set of session values 280 from a session description is included in a request for a data-transfer-rate value 250, this table 200 can be referenced in response to the request to determine the data-transfer-rate value of 2 (column 250).

In some embodiments, the payload type value 210 can be a dynamic payload type value (e.g., a payload type value between 96 and 127 in SDP). In some embodiments, a dynamic payload type is not associated with a predefined data rate value. In some embodiments, the encoding parameter value 240 can be an indicator, for example, of a number of audio channels associated with a media session. In some embodiments, the payload type value 210, the encoding name 220, and the clock rate value 230 can be required to determine a data-transfer-rate value 250.

In some embodiments, this table 200 can include session values 205 other than those shown in FIG. 2 such as, for example, a date value, a timestamp value, a data rate value, and/or an encryption type value. In some embodiments, a data-transfer-rate value 250 can be determined based on a portion of the session values 205 shown in FIG. 2. For example, as shown in table 200, a data-transfer-rate value 250 can be uniquely determined based on an encoding name 220 and a clock rate value 230.

Referring back to FIG. 1, when a predefined data-transfer-rate value cannot be determined based on a set of session values from a session description, a request for a data-transfer-rate value can be defined and sent to, for example, an entity associated with the session exchange device 110 such as a network administrator 180. In some embodiments, a data-transfer-rate value cannot be determined because a session description and/or a portion of the session description (e.g., a set of session values) has not been associated with a data-transfer-rate value. For example, the session description can be a session description that has not previously been encountered, and thus has not yet been associated with a data-transfer-rate value. The session description may not have been encountered because the session description is a proprietary session description. In these types of situations, the session description can be referred to as an unrecognized session description or an unknown session description. In some embodiments, the session description can be a recognized session description that has not yet been associated with a data-transfer-rate value.

When a data-transfer-rate value is received in response to the request, the data-transfer-rate value can be associated with at least a portion of the session description (e.g., set of session values) so that the data-transfer-rate value can be retrieved and used to manage a data-transfer rate of a media signal for future media sessions established based on at least a portion of the session description.

For example, FIG. 2 illustrates a set of session values 270 from a session description that do not match any set of session values 280 in table 200. A notification can be sent to a user (e.g., a network administrator) indicating that a data-transfer-rate value cannot be retrieved because the set of session values 270 does not match any of the sets of session values 280 included in the table 200. In other words, the set of session values 270 is different than the sets of session values 280 included in the table 200. In some embodiments, the user can be prompted to define an entry in the table 200 that includes a data-transfer-rate value 250 for the set of session values 270. The notification can be sent to a user-interface, included in a log that can be viewed by the user, and/or included in an simple network management protocol (SNMP) message (e.g., SNMP trap).

Referring back to FIG. 1, in some embodiments, a default data-transfer-rate value can be sent to and/or used by, for example, the data-transfer-rate management module 130 when a predefined data-transfer-rate value is not associated with at least a portion of a session description. For example, if a data-transfer-rate value (e.g., a predefined data-transfer-rate value) cannot be determined based on a set of session values received at the data-transfer-rate management module 130, a default data-transfer-rate value can be used by the data-transfer-rate management module 130 to manage the media signal 162 associated with the media session 164 established based on the set of session values. In some embodiments, a default data-transfer-rate value can be defined based on, for example, a maximum predefined data-transfer-rate value included in the data-transfer-rate database 120.

In some embodiments, managing the media signal 162 based on a default data-transfer-rate value can substantially prevent the media signal 162 from being interrupted in an undesirable fashion because a predefined data-transfer-rate value could not be determined or was not received. For example, if a data-transfer-rate value cannot be determined and if a default data-transfer-rate value is not used to manage the media signal 162, most or all media IP packets associated with the media signal 162 can be dropped.

In some embodiments, if a data-transfer-rate value is modified or newly defined by a user during transmission of the media signal 162, the media signal 162 can be managed based on the modified or new data-transfer-rate value. For example, a data-transfer rate of the media signal 162 associated with a media session 164 can be managed based on a default data-transfer-rate value because a predefined data-transfer-rate value could not be determined based on a set of session values used to define the media session 164. If a user-defined data-transfer-rate value is associated with the set of session values before the media session 164 is terminated, the media signal 162 can be managed based on the user-defined data-transfer-rate value for the remainder of the media session 164.

In some embodiments, the data-transfer-rate management module 130 can be configured to check periodically the data-transfer-rate database 120 for updates to data-transfer-rate values and/or portions of session descriptions so that the media signal 162 can be managed based on current data-transfer-rate values. In some embodiments, the data-transfer-rate database 120 can be configured to notify the data-transfer-rate management module 130 that an update to a data-transfer-rate value has been defined. The data-transfer-rate management module 130 can be configured to modify management of, for example, one or more portions of media signal 162 in response to the update notification, if necessary.

In some embodiments, an additional or different data-transfer-rate value can be determined in response to a change in the media session 164. The different data-transfer-rate value can replace a data-transfer-rate value being used to manage the media signal 162. The additional data-transfer-rate value can be used, in addition to a data-transfer-rate value already being used, to manage the media signal 162. For example, if the media session 164 is modified during transmission of the media signal 162 in response to a change in a session value associated with the media session 164, an additional or different data-transfer-rate value can be determined based on the changed session value. The media signal 162 can be managed based on the additional or different data-transfer-rate value for the remainder of the media session 164. In some embodiments, a change in a session value will not trigger a change in a data-transfer-rate value used to manage the media signal 162. For example, the changed session value may not material to a data-transfer-rate value determination.

In some embodiments, a session description can include an indicator to disable management of the media signal 162 based on a data-transfer-rate value. For example, a session description can include a binary indicator (e.g., a 1 or a 0) to trigger the data-transfer-rate management module 130 to allow a media signal 162 associated with the media session 164 to be transmitted without a data-transfer rate value such as a bandwidth limitation.

In some embodiments, a temporary data-transfer-rate value can be determined based on a partial set of session values when a predefined data-transfer-rate value is not associated with the full set of session values from a session description. For example, as shown in FIG. 2, even though the set of session values 270 is not included in the table 200, the data-transfer-rate value of 3 (column 250) in the last entry in the table 200 can be used to manage a media signal. The data-transfer-rate value can be determined based on the clock rate value of 1 megahertz (MHz) (column 230) in the set of session values 270. A notification can be sent to, for example, a user indicating that a temporary data-transfer-rate value is being used to manage a media signal because a predefined data-transfer-rate value could not be determined based the full set of session values 270. In some embodiments, the temporary data-transfer-rate value can be an interpolated value or an extrapolated value.

Although the session exchange device 110 shown in FIG. 1 includes a data-transfer-rate database 120, in some embodiments, the information included in and/or the functions associated with the data-transfer-rate database 120 can be included in a shared database (not shown) or a distributed database (not shown) that can be accessed by the session exchange device 110. In some embodiments, a shared data-transfer-rate database or a distributed data-transfer-rate database can be associated with a layer-5 segment (e.g., session layer) of network 140 that includes, for example, session exchange device 110. For example, the data-transfer-rate database 120 can be associated only with a layer-5 segment of the network 140 that includes a few session exchange devices (not shown). In some embodiments, the data-transfer-rate database 120 is a database local to session exchange device 110 and cannot be accessed by a separate session exchange device (not shown) even if the separate session exchange device is in communication with session exchange device 110. In some embodiments, the separate session exchange device may not have permission to access the data-transfer-rate database 120 of the session exchange device 110.

In some embodiments, the session exchange device 110 can be connected with a network controller (not shown) that is a centralized management component that controls, configures, and coordinates at least a portion of the network 140. In some embodiments, the session exchange device 110 can be a session-aware device configured to modify routing of the media signal 162 using, open systems interconnection (OSI) layer-5 parameters (e.g., call admission control (CAC)-related information) and/or OSI layer-3 parameters.

Figure 3:
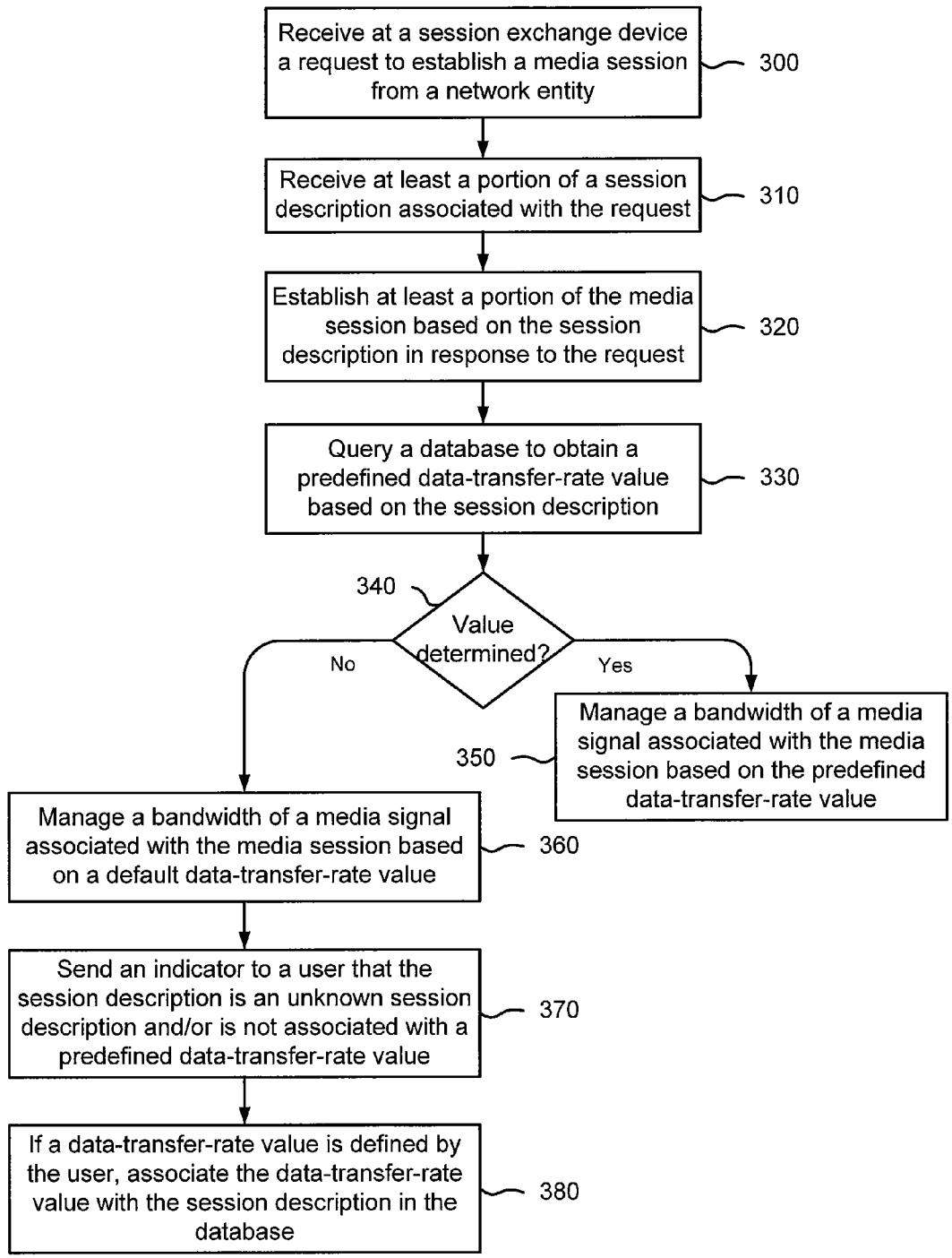
FIG. 3 is a flowchart that illustrates a method for determining a data-transfer-rate value, according to an embodiment of the invention.

FIG. 3 is a flowchart that illustrates a method for determining a data-transfer-rate value, according to an embodiment of the invention. As shown in the flowchart, a request to establish a media session is received from a network entity at a session exchange device at 300. The request can be received from an endpoint associated with a MoIP network.

At least a portion of a session description associated with the request is received at 310. In some embodiments, the session description can include one or more session values and the portion of the session description can correspond to a set of session values. In some embodiments, the session description can be defined based on SDP.

At least a portion of the media session is established based on the session description in response to the request at 320. The portion of the media session can be established based on a series of requests and responses transmitted between the network entity and the session exchange device.

A database is queried to obtain a predefined data-transfer-rate value based on the session description at 330. In some embodiments, the database can be referred to as a data-transfer-rate database. The database can be queried based on the portion of the session description (e.g., a set of session values). In some embodiments, the database can be local to the session exchange device. For example, the database can be at the session exchange device.

If a predefined data-transfer-rate value can be determined at 340 based on the portion of the session description, a bandwidth of a media signal associated with the media session is managed based on the predefined data-transfer-rate value at 350. In some embodiments, if the media signal associated with the media session is sent before the predefined data-transfer-rate value can be determined and/or implemented, the bandwidth of the media signal can be managed based on a default data-transfer-rate value until the predefined data-transfer-rate value is determined and/or implemented.

If a predefined data-transfer-rate value cannot be determined at 340 based on the portion of the session description, the bandwidth of the media signal associated with the media session is managed based on a default data-transfer-rate value at 360. A predefined data-transfer-rate value may be indeterminate, for example, because the session description may be an unknown session description. For example, a combination of session values from the session description may not be previously associated with a predefined data-transfer-rate value.

An indicator is sent to a user that the session description is an unknown session description and/or is not associated with a predefined data-transfer-rate value at 370. The indicator can be sent to a user-interface that can be viewed by the user (e.g., a network administrator). In some embodiments, an indicator can be sent to a mobile device (e.g., cell phone) or as an e-mail message.

If a data-transfer-rate value is defined by the user, the session description can be associated with the data-transfer-rate value and added to the database at 380. The data-transfer-rate value can be associated with a set of session values from the session description as specified by the user. In some embodiments, if the data-transfer-rate value is defined by the user before the media session is terminated, the media signal can be managed based on the newly defined data-transfer-rate value for the remainder of the media session.

In some embodiments, the database can be queried by an entity separate from the session exchange device. For example, a session controller associated with the session exchange device can be configured to receive the session description and can be configured to handle interactions with the database (e.g., executing database queries, adding entries to the database). The session controller can be configured to send data-transfer-rate values (e.g., default data-transfer-rate values, predefined data-transfer-rate values, etc.) to the session exchange device for management of the media signal at the session exchange device.

In some embodiments, the order of some of the steps in the flowchart shown in FIG. 3 can be modified. For example, at least a portion of the media session can be established based on the session description in response to the request after a predefined data-transfer-rate value is determined. In some embodiments, a default data-transfer-rate value can be determined before a portion of the media session is established based on the session description in response to the request.

Figure 4:
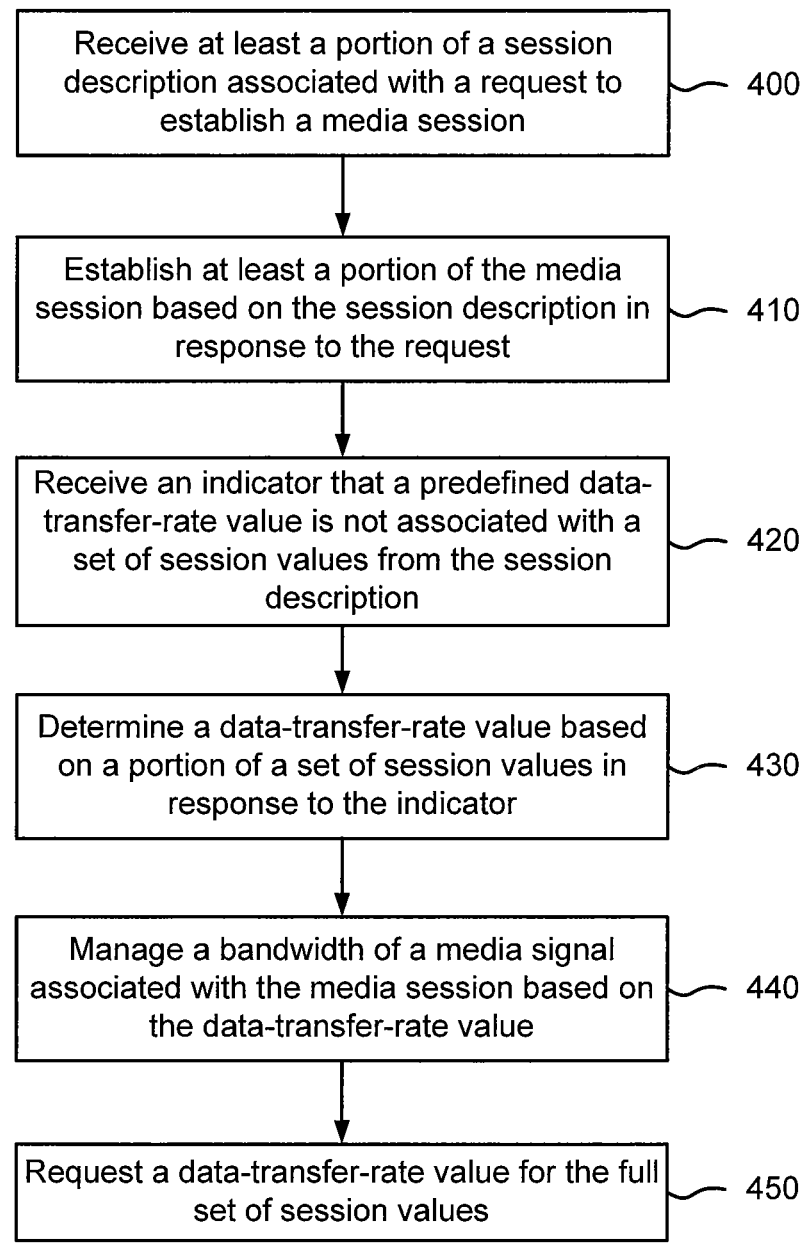
FIG. 4 is a flowchart that illustrates a method for determining a data-transfer-rate value, according to an embodiment of the invention.

FIG. 4 is a flowchart that illustrates a method for determining a data-transfer-rate value, according to an embodiment of the invention. At least a portion of a session description associated with a request to establish a media session is received at 400. At least a portion of the media session is established based on the session description in response to the request at 410. An indicator that a predefined data-transfer-rate value is not associated with a set of session values from the session description is received at 420.

A data-transfer-rate value is determined based on a portion of a set of session values included in the session description in response to the indicator at 430. In some embodiments, the portion of the set of session values can be used to calculate the data-transfer-rate value based on information included in a data-transfer-rate database.

A bandwidth of a media signal associated with the media session is managed based on the data-transfer-rate value at 440. A data-transfer-rate value for the full set of parameter values is requested at 450. The request can be sent to a user via a user-interface. If a data-transfer-rate value is defined by the user, the set of session values can be associated with the data-transfer-rate value and added to, for example, a data-transfer-rate database. In some embodiments, if the data-transfer-rate value is defined by the user before the media session is terminated, the media signal can be managed based on the newly defined data-transfer-rate value for the remainder of the media session.

Some embodiments relate to a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signals; and hardware devices that are specially configured to store and execute program code, such as Application-Specific Integrated Circuits (ASICs), Programmable Logic Devices (PLDs), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, methods and apparatus for media signal management within a MoIP network based on a session description are described. While various embodiments have been described above, it should be understood that they have been presented by way of example only, and various changes in form and details may be made. For example a data-transfer-rate management module can be configured to manage the data-transfer rate of multiple media signals associated with one or more media sessions.

What is claimed is:

1. A method, comprising:
receiving a request to establish at least a portion of a media session between a session exchange device and a network entity based on at least a portion of a session description, the session exchange device and the network entity being associated with a media over Internet protocol (MoIP) network;
querying a data-transfer-rate database configured to store predetermined data-transfer-rate values;
receiving an indicator at the session exchange device that the portion of the session description is not associated with a predefined data-transfer-rate value; and
sending a request for a user-defined data-transfer-rate value in response to the indicator, wherein the user-defined data-transfer-rate value indicates a maximum or minimum bandwidth allocation that modifies, after the media session is established, a bandwidth associated with transmitting packets of the same media session from the session exchange device.

2. The method of claim 1, wherein the media session is a first media session, the session description is a first session description, the portion of the session description corresponds with a set of session values,
the method further comprising:
receiving the user-defined data-transfer-rate value in response to the request associated with the user-defined data-transfer-rate value;
receiving an indicator that at least a portion of a second media session different than the first media session has been established based on a second session description including the set of session values; and
sending a media signal associated with the second media session based on the user-defined data-transfer-rate value.

3. The method of claim 1, wherein the user-defined data-transfer-rate value is used to limit a bandwidth of a media signal associated with the media session.

4. The method of claim 1, wherein the session description is a first session description, the portion of the session description corresponds with a set of session values,
the method further comprising:
receiving the user-defined data-transfer-rate value in response to the request associated with the user-defined data-transfer-rate value; and
associating the user-defined data-transfer-rate value with a second session description including the set of session values such that the user-defined data-transfer-rate value can be retrieved based on at least one session value from the set of session values.

5. The method of claim 1, further comprising:
receiving at the session exchange device a session control signal associated with a session layer of the MoIP network, the session description being communicated to the session exchange device via the session control signal;
receiving the user-defined data-transfer-rate value in response to the request associated with the user-defined data-transfer-rate value; and sending a media signal associated with a media layer of the MoIP network based on the user-defined data-transfer-rate value.

6. The method of claim 1, wherein the session description is based on a session description protocol.

7. The method of claim 1, further comprising sending a media signal associated with the media session based on a default data-transfer-rate value in response to the indicator associated with the predefined default data-transfer-rate value.

8. A method, comprising:
receiving at a session exchange device a request to establish at least a portion of a media session between the session exchange device and a network entity based on a session description, the session exchange device being associated with a layer-5 segment of a MoIP network;
determining that the session description is different than each session description from a plurality of session descriptions associated with the layer-5 segment of the MoIP network, wherein the determining includes determining based on a set of session values, the set of session values including at least one of a payload type indicator, an encoding name, a clock rate indicator, or an encoding value included in the session description, wherein the session values are stored in a data-transfer-rate database;
sending an indicator that the session description is an unknown session description in response to the determining;
establishing at least a portion of the media session based on the session description; and
sending a media signal associated with the media session based on a default data-transfer-rate value in response to the determining, wherein the default data-transfer-rate value indicates a maximum or minimum bandwidth allocation that modifies, after the media session is established, a bandwidth associated with transmitting packets of the same media session from the session exchange device.

9. The method of claim 8, wherein the plurality of session descriptions are included in a database local to the layer-5 segment, the determining includes determining at the session exchange device.

10. The method of claim 8, wherein the session description includes a set of codec parameter values.

11. The method of claim 8, wherein the session description is a first session description including a set of session values, the method further comprising:
receiving a data-transfer-rate value in response to the indicator; and
associating the user-defined data-transfer-rate value with a second session description including the set of session values such that the user-defined data-transfer-rate value can be retrieved based on at least one session value from the set of session values.

12. The method of claim 8, further comprising:
sending a request for a data-transfer-rate value to an entity disposed outside of the layer-5 segment.

13. A method, comprising:
receiving, by a session exchange device, an indicator that at least a portion of a media session has been established between the session exchange device and a network entity based on a set of session values associated with a session description;
determining, based on the set of session values, that a predefined bandwidth limit value has not been associated with the session description, wherein the set of session values includes at least one of a payload type indicator, an encoding name, a clock rate indicator, or an encoding value, wherein the session values are stored in a data-transfer-rate database; and determining a bandwidth limit value based on at least a portion of the set of session values after the determining associated with the predefined bandwidth limit, wherein the bandwidth limit value is used to indicates a maximum or minimum bandwidth allocation that modifies, after the media session is established, a bandwidth associated with transmitting packets of the same media session from the session exchange device.

14. The method of claim 13, further comprising:
sending a media signal associated with the portion of the media session based on the bandwidth limit value; and
sending a request for a user-defined bandwidth limit value in response to the determining associated with the predefined bandwidth limit value.

15. The method of claim 13, further comprising:
sending a media signal associated with the portion of the media session based on the bandwidth limit value;
receiving a user-defined bandwidth limit value associated with the session description; and
modifying the sending based on the user-defined bandwidth limit value.

16. The method of claim 13, wherein the portion includes at least two session values.

17. The method of claim 13, wherein the set of session values is associated with a proprietary codec.

18. A system including:
a session exchange device configured to receive a request to establish at least a portion of a media session between a session exchange device and a network entity based on at least a portion of a session description, the session exchange device and the network entity being associated with a media over Internet protocol (MoIP) network, to receive an indicator at the session exchange device that the portion of the session description is not associated with a predefined data-transfer-rate value and to send a request for a user-defined data-transfer-rate value in response to the indicator, wherein the user-defined data-transfer-rate value indicates a maximum or minimum bandwidth allocation that modifies, after the media session is established, a bandwidth associated with transmitting packets of the same media session from the session exchange device; and
a data-transfer-rate database configured to store predetermined data-transfer-rate values, wherein the data-transfer-rate management module queries the data-transfer-rate database to receive the indicator.

19. A non-transitory computer readable medium comprising computer executable instructions that when executed by a processor of a computer control the computer to perform steps comprising, comprising:
receiving a request to establish at least a portion of a media session between a session exchange device and a network entity based on at least a portion of a session description, the session exchange device and the network entity being associated with a media over Internet protocol (MoIP) network;
querying a data-transfer-rate database configured to store predetermined data-transfer-rate values;
receiving an indicator at the session exchange device that the portion of the session description is not associated with a predefined data-transfer-rate value, wherein the indicator is in response to querying a data-transfer-rate database configured to store predetermined data-transfer-rate values; and
sending a request for a user-defined data-transfer-rate value in response to the indicator, wherein the user-defined data-transfer-rate value indicates a maximum or minimum bandwidth allocation that modifies, after the media session is established, a bandwidth associated with transmitting packets of the same media session from the session exchange device.

* * * * *